US012589778B2

(12) United States Patent
Sichau et al.

(10) Patent No.: US 12,589,778 B2
(45) Date of Patent: Mar. 31, 2026

(54) ELEVATED RAILWAY-LIKE TRANSPORT SYSTEM, METHOD FOR DISTANCE CONTROL, COMPUTER PROGRAM PRODUCT, AND CONTROL DEVICE

(71) Applicant: Ottobahn GmbH, Pullach im Isartal (DE)

(72) Inventors: Adrian Heinrich Sichau, Holzgerlingen (DE); Bernd Stuke, Leonberg (DE); Felix Jaegle, Ditzingen (DE); Gael Le Hen, Ludwigsburg (DE); Olaf Ohlhafer, Erligheim (DE)

(73) Assignee: Ottobahn GmbH, Pullach im Isartal (DE)

( * ) Notice: Subject to any disclaimer, the term of this patent is extended or adjusted under 35 U.S.C. 154(b) by 754 days.

(21) Appl. No.: 17/996,750

(22) PCT Filed: Apr. 19, 2021

(86) PCT No.: PCT/DE2021/100357
§ 371 (c)(1),
(2) Date: Nov. 30, 2022

(87) PCT Pub. No.: WO2021/213589
PCT Pub. Date: Oct. 28, 2021

(65) Prior Publication Data
US 2023/0227077 A1    Jul. 20, 2023

(30) Foreign Application Priority Data
Apr. 22, 2020    (DE) .......................... 102020205081.3

(51) Int. Cl.
| | |
|---|---|
| B61B 3/02 | (2006.01) |
| B61B 7/06 | (2006.01) |
| B61B 12/06 | (2006.01) |
| G01G 19/52 | (2006.01) |

(52) U.S. Cl.
CPC .................. *B61B 3/02* (2013.01); *B61B 7/06* (2013.01); *B61B 12/06* (2013.01); *G01G 19/52* (2013.01)

(58) Field of Classification Search
CPC .. B61B 3/02; B61B 7/06; B61B 12/06; G01G 19/52
See application file for complete search history.

(56) References Cited

U.S. PATENT DOCUMENTS

| | | | | |
|---|---|---|---|---|
| 4,627,361 A | * | 12/1986 | Tarassoff | .............. B61B 12/022 104/178 |
| 4,766,547 A | * | 8/1988 | Modery | ................ B61L 23/005 700/229 |

(Continued)

FOREIGN PATENT DOCUMENTS

| | | |
|---|---|---|
| CN | 105398452 A | 3/2016 |
| CN | 110217245 A | 9/2019 |

(Continued)

OTHER PUBLICATIONS

International Search Report for PCT/DE2021/100357, Issued Dec. 2, 2021.

*Primary Examiner* — Jason C Smith
(74) *Attorney, Agent, or Firm* — WTA IP Law P.C.

(57) ABSTRACT

An elevated railway-like transport system. The system includes a carrier system with rail-like or cable-like carrier elements that are fastened in the area of portal-like support elements, and includes self-propelled carriages, each of which includes a drive unit that cooperates with the carrier elements, and a gondola that is connected to the drive unit via a carrier device, preferably in the form of a carrying arm, and that is used for passenger transport and/or cargo transport. The carriages are movable independently of one
(Continued)

another along the carrier elements, and a distance is formed between two successive carriages on the same carrier element.

13 Claims, 2 Drawing Sheets

(56) References Cited

U.S. PATENT DOCUMENTS

| | | | | |
|---|---|---|---|---|
| 5,172,640 A | * | 12/1992 | Cathiard | B61B 12/022 |
| | | | | 104/178 |
| 2013/0098260 A1 | * | 4/2013 | Creissels | B61B 7/06 |
| | | | | 104/112 |
| 2017/0313328 A1 | * | 11/2017 | Phadke | B61C 3/00 |
| 2019/0241202 A1 | | 8/2019 | Thomas | |
| 2023/0227077 A1 | * | 7/2023 | Sichau | B61B 3/02 |
| | | | | 104/89 |

FOREIGN PATENT DOCUMENTS

| | | | | | |
|---|---|---|---|---|---|
| CN | 110217245 B | * | 7/2023 | ............. | B61B 12/00 |
| DE | 4131973 A1 | * | 4/1992 | ........... | B61B 12/007 |
| DE | 4241677 A1 | | 6/1994 | | |
| DE | 4308077 A1 | | 9/1994 | | |
| DE | 102017217830 A1 | | 4/2019 | | |
| DE | 102019217948 A1 | | 5/2021 | | |
| EP | 4061686 B1 | * | 7/2025 | .............. | B61B 7/06 |
| JP | H0539027 A | | 2/1993 | | |
| JP | H0569820 A | | 3/1993 | | |
| JP | 2006335076 A | | 12/2006 | | |
| JP | 2007326442 A | | 12/2007 | | |
| JP | 2008290663 A | | 12/2008 | | |
| JP | 2013500187 A | | 1/2013 | | |
| JP | 2014236622 A | | 12/2014 | | |
| KR | 20190094298 A | * | 8/2019 | ........... | B65G 1/0457 |
| WO | 2006076792 A1 | | 7/2006 | | |
| WO | WO-2017205546 A1 | * | 11/2017 | .............. | F41G 7/30 |
| WO | 2019099417 A1 | | 5/2019 | | |

* cited by examiner

ELEVATED RAILWAY-LIKE TRANSPORT SYSTEM, METHOD FOR DISTANCE CONTROL, COMPUTER PROGRAM PRODUCT, AND CONTROL DEVICE

FIELD

The present invention relates to an elevated railway-like transport system as used in conjunction with self-propelled carriages. "Self-propelled carriages" are understood to mean carriages that include their own drive, so that they may move independently of one another along routes of the transport system. Driverless carriages as well as carriages that are controlled by an operator come into consideration. Moreover, the present invention relates to a method for controlling the distance between two carriages at an elevated railway-like transport system, a computer program product as an integral part of the transport system or that is suitable for carrying out the distance control method, and a control device.

BACKGROUND INFORMATION

An elevated railway-like transport system is described in U.S. Patent Application Publication No. US 2017/0313328 A1. The conventional transport system is characterized by self-propelled carriages or gondolas that may be individually moved along a support structure.

A further generic transport system is described in German Patent Application No. DE 10 2019 217 948 A1. This transport system is characterized by rail-like carrier elements of the support structure that are mounted in the area of portal-like support elements or supported there. Here as well, self-propelled carriages are provided with gondolas, which may be used for either passenger transport or cargo transport.

SUMMARY

An elevated railway-like transport system according to the present invention may have the advantage that it is optimally adapted to the statics of the carrier system, and in particular prevents overloading of the carrier system due to an excessive weight force of the self-propelled carriages. As a result, an optimal coordination between the statics of the carrier system and the operation of the self-propelled carriages is possible. This results in the option of allowing an optimal support structure with the least possible complexity, or few material requirements for the support structure, for reliable operation of the carriages.

To achieve the advantages mentioned above, for an elevated railway-like transport system according to the present invention it is provided that weight detection means (i.e., a weight detection device) for at least indirectly detecting the weight of the self-propelled carriages are provided. In the simplest case, such weight detection means may be used to avoid an overload of the carrier system with possibly resulting damage to the carrier system, for example by outputting an overload warning or adjusting the travel operation along the transport system.

Advantageous refinements of the elevated railway-like transport system according to the present invention are disclosed herein.

As a result of the transport system being designed for (autonomous) operation of self-propelled carriages, i.e., different distances between the individual carriages typically resulting during operation of the carriages, it may be provided that not just the weight force of a single gondola or a single self-propelled carriage, but, rather, the weight forces of multiple gondolas or self-propelled carriage simultaneously act in a certain section of the carrier system. This weight force is typically greater, the smaller the distance is between the individual carriages. Against this background, one particularly preferred embodiment of the transport system provides that a control device is provided which is designed to control the distance between carriages, in particular a minimum distance between two successive carriages, as a function of the weights of the carriages that are detected by the weight detection means.

With regard to the specific design embodiment of the weight detection means, there are different options that may be used or provided, either singly or in combination.

A first design embodiment of the weight detection means provides that the weight detection means include at least one sensor in the area of the carriage, in particular in the area of the suspension (support arm) that connects the drive unit to the gondola. This has the advantage of a direct, immediate detection of the weight of the carriage.

Alternatively or additionally, it is possible for the weight detection means to include at least one sensor that is situated in the area of a support element and/or carrier element of the carrier system. This has the advantage that a separate sensor does not have to be used for each carriage.

In particular, it is provided that the at least one sensor is designed in the form of a strain gauge. Such a design of the sensor is particularly compact, and with relatively little capital expenditure allows a sufficiently accurate detection of the weight force of the carriage or a deformation of a support arm of the carriage, of a carrier element, or of a support element that is detected due to the carriage.

However, it is also possible for the weight force of a gondola to be ascertained not directly by a (force) sensor, but, rather, indirectly by detecting the payload situated in the area of a gondola. With knowledge of the net weight of the carriage (without a payload), this allows separate sensors to be dispensed with. Such an embodiment of the present invention therefore provides that the weight detection means include an image detection system that is designed to optically detect the payload present in the area of the gondola, and to compute the weight of the carriage based on predefined criteria and a predefined weight of the carriage without a payload. For the recognition of persons inside the gondola, such criteria may include, for example, the assumption of a typical average weight of a person, for example also as a function of a detected size of the person.

Yet a further alternative embodiment for detecting the weight force of the carriage provides that the weight detection means include a pressure sensor that detects a payload-dependent pneumatic tire pressure prevailing in a tire element of the drive unit. Such an embodiment comes into consideration when the gondola or its support arm is supported via at least one gas-filled, in particular air-filled, tire of the drive unit at the carrier system.

A further preferred example embodiment of the present invention provides that distance detection means (i.e., a distance detection device) are provided, preferably in the area of the gondolas, in order to detect the distance between two carriages, and that the distance between the carriages is suppliable to the control device as an input parameter. Such an embodiment thus allows a closed control loop for ensuring the maintenance of a desired distance or a minimum distance between the carriages.

A further embodiment of the transport system provides that the distance between two successive carriages, in addition to the weight of the carriages, is controllable by further influencing parameters such as the wind strength, the temperature, the amount of precipitation, regulatory requirements, or the like. Such influencing parameters typically reduce the weight force of the carriages that is absorbable by the carrier system, and thus increase the required minimum distance between two carriages.

Moreover, the present invention includes a method for controlling the distance between two carriages at an elevated railway-like transport system that is designed in the manner according to the present invention, the method including at least the following steps: Weights of at least two successive carriages along the carrier elements are detected. In addition, a minimum distance between the two successive carriages is determined, based on predefined maximum loads on the carrier system. Lastly, the minimum distance between the carriages is ensured, at least indirectly, by outputting information to an operator of at least one carriage, and/or by direct activation of drives of at least one carriage by the control device.

In one refinement of the described method of the present invention, it is provided that the distance between two successive carriages is reduced to the minimum distance, optionally taking into account factors that increase the minimum distance. Such an embodiment allows in particular an optimal or maximum capacity utilization of the transport system, for example a maximum throughput of carriages that do not contain payloads during empty trips.

Moreover, the present invention includes a computer program product, in particular a data medium or a data program, that is designed as an integral part of a transport system according to the present invention, or that executes at least one program step according to a method according to the present invention, and a control device.

Further advantages, features, and particulars of the present invention result from the following description of preferred specific embodiments of the present invention, and based on the figures.

DETAILED DESCRIPTION OF EXAMPLE EMBODIMENTS

Figure 1:
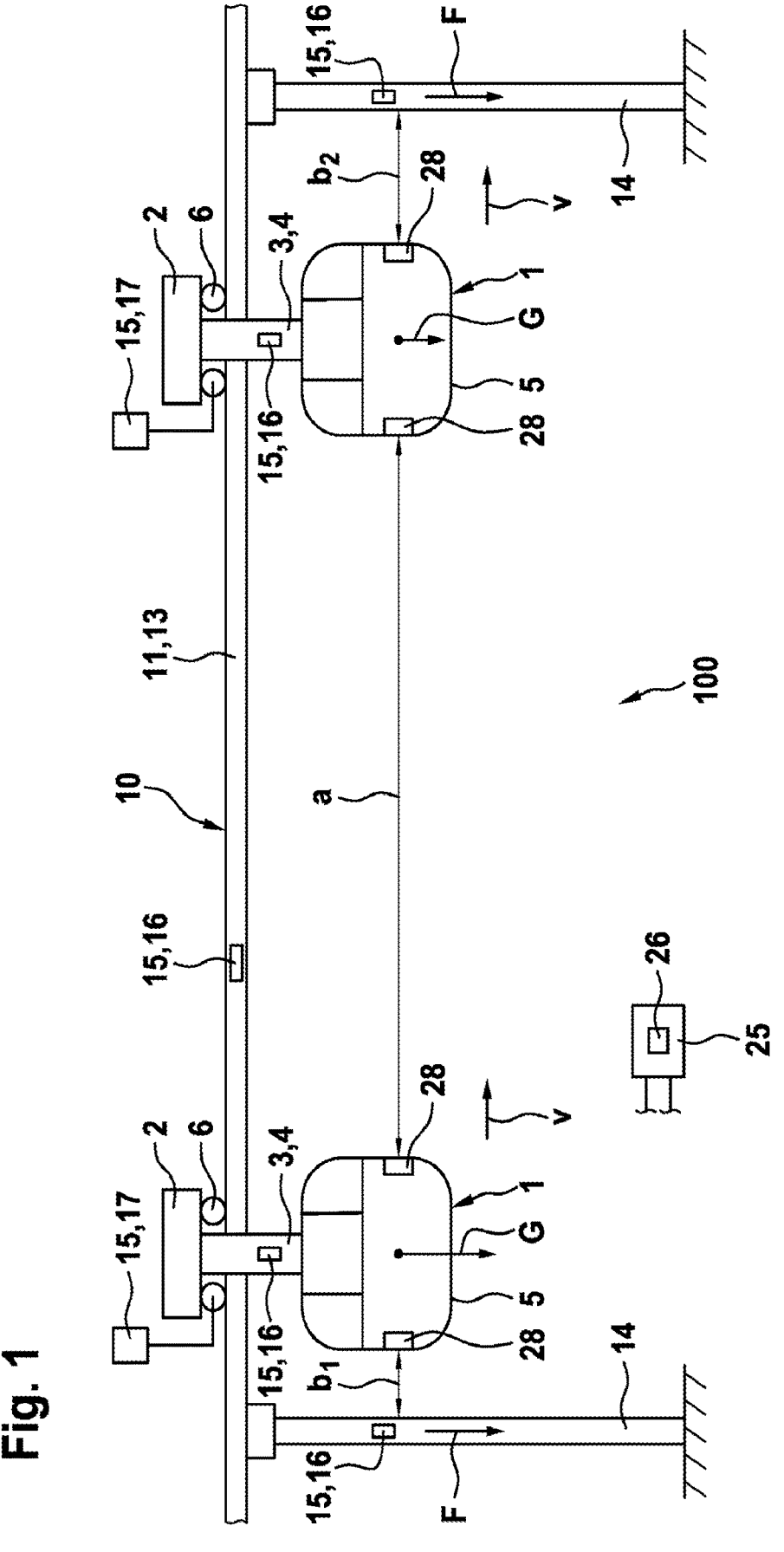
FIG. 1 shows a greatly simplified side view of an elevated railway-like transport system that includes two gondolas, used for passenger transport, at self-propelled carriages that travel along a shared route at a small distance from one another.
Figure 2:
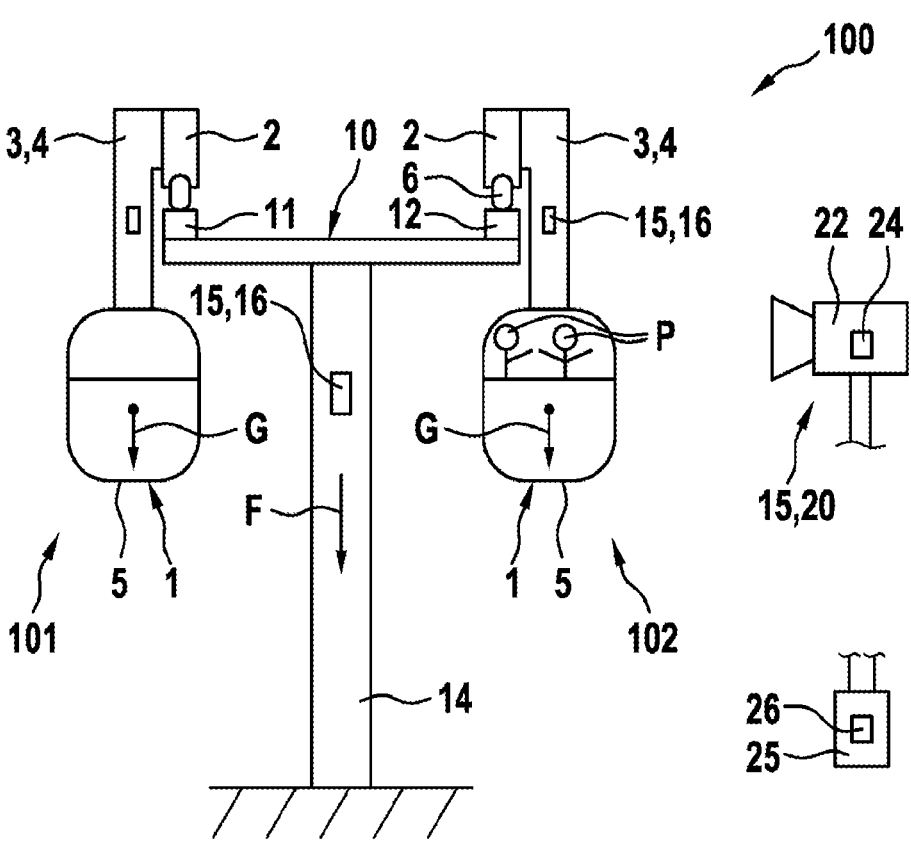
FIG. 2 shows a simplified side view of a transport system that is traversed by two gondolas on parallel routes.

Identical elements or elements having the same function are provided with the same reference numerals in the figures.

An elevated railway-like transport system 100 for self-propelled carriages 1 is partially illustrated in the figures. Self-propelled carriages 1 include a drive unit 2 with at least one electric motor (not illustrated), drive unit 2 being connected to a gondola 5 with the aid of a carrier device 3, preferably in the form of a support arm 4. Gondola 5 is illustrated in the figures as a gondola 5 for transporting persons P as a payload. Of course, carriages 1 or gondolas 5 may also be designed for cargo transport.

Transport system 100 forms a route network, which in the figures includes two routes 101, 102 as an example, situated in parallel to one another. Self-propelled carriages 1 may be operated along routes 101, 102 at variable speeds and independently of one another, in that drive units 2 are activated either by an operator situated inside gondola 5, or autonomously by a control unit, not illustrated or described in greater detail.

Transport system 100 also includes a carrier system 10 that includes carrier elements 11, 12 situated in parallel to one another by way of example, which likewise, strictly by way of example, are designed in the form of carrier rails 13.

Alternatively, it is also possible for carrier elements 11, 12 to be designed in the form of support cables. Carriages 1 via their particular drive unit 2 are situated in operative connection with carrier element 11, 12, and may thus move along carrier elements 11, 12. As an example, for this purpose drive units 2 include (air-filled) drive rollers 6 that roll on carrier rails 13. Carrier elements 11, 12 are fastened via a crossbar in the area of portal-like support elements 14, for example, which in turn are anchored underground in a manner not illustrated.

To make optimal use of the statics of the carrier system 10 with regard to its strength or load-bearing capacity and in particular not to overload the carrier system, weight detection means (i.e., a weight detection device) 15 in the form of at least one strain gauge 16 are situated in the area of the support elements 14, for example. Weight detection means 15 or the at least one strain gauge 16 are/is arranged in such a way that weight force F acting on same, in particular in parallel to the direction of extension of support element 14, may be detected. Weight force F is made up, on the one hand, of the areas of carrier elements 11, 12 situated above weight detection means 15, and on the other hand, of weight force G of carriages 1 that are situated in the area of support element 14. In particular, (only) weight force G of carriage(s) 1 is detected via an appropriate calibration.

Alternatively or additionally, it may also be provided to situate weight detection means 15, in particular likewise preferably in the form of strain gauges 16, in the area of particular carrier element 11, 12, or in the area of carrier device 3 of carriage 1.

If drive unit 2 of carriage 1 is supported on carrier element 11, 12 via drive rollers 6 that are filled with gas or air, weight detection means 15 may also include at least one pressure sensor 17 that detects the pressure prevailing in a drive roller 6 in order to deduce therefrom weight force G of carriage 1.

Once again alternatively or additionally, it may be provided that weight detection means 15 include an image detection system with a camera 22 that is designed to optically detect the payload (persons P, for example) that is/are present in the area of carriage 1 or of gondola 5, based on an evaluation system 24, and to estimate weight force G of carriage 1 or its payload based on predefined criteria and a predefined net gondola weight.

The data of weight detection means 15 are suppliable to an input interface of a control device 25 as an input parameter. In particular, control device 25 includes an algorithm 26 in the form of a data program that is designed to ascertain, as a function of the input values of weight detection means 15, a (minimum) distance a between two carriages 1 that move in succession along routes 101, 102.

It is to be taken into account that the load on carrier system is lower, the greater distance a is between two carriages 1. For this purpose, for carriages 1 that are autonomously operated (i.e., without an operator), control device 25 is additionally designed to control travel velocity V of the carriages by appropriately activating drive units 2 of carriages 1 via an output interface of control device 25, so that desired distance a between two carriages 1 is maintained. For operation of carriages 1 that takes place via an operator, appropriate communications may be output to the operator of carriage 1 visually, acoustically, or in some other way in order to maintain (minimum) distance a. In addition, algorithm 26 includes the option of taking into account boundary conditions that may be present, such as environmental influences (wind, snow load, temperature, etc.) in computing distance a.

Furthermore, as a supplement, distance a between two carriages 1 situated on a route 101, 102 is also a function of whether carriages 1 are simultaneously situated on other route 102, 101 close to first-named carriage 1, which increases distance a.

To check distance a between two carriages 1 or to allow a control of distance a with the aid of control device 25, each carriage 1 in the area of its gondola 5 also includes distance sensors 28 that are situated in the travel direction or opposite to the travel direction of the carriage, and that are designed to ascertain distance a from carriage 1 that is adjacent thereto, and to supply this information to device 25, for example, as an input parameter.

Described transport system 100 may be altered or modified in various ways without departing from the concept according to the present invention. For example, it is also possible to dynamically adapt distance a to the particular position of carriage 1 on route 101, 102, or as a function of a distance b1, b2 between carriages 1 and a support element 14, in particular when the most closely spaced operation possible or the smallest possible distances a between carriages 1 is/are to be achieved.

What is claimed is:

1. An elevated railway-like transport system, comprising:
   a carrier system with rail-like or cable-like carrier elements that are fastened in an area of support elements, and the carrier system including self-propelled carriages, each of the carriages including a drive unit that cooperates with the carrier elements, and a gondola that is connected to the drive unit via a carrier device, and that is used for passenger transport or cargo transport, the carriages being movable independently of one another along the carrier elements, and a distance being formed between two successive carriages on the same carrier element, and wherein the carrier system further includes a weight detection device configured to indirectly detect a weight of the self-propelled carriages, wherein a minimum distance between two successive carriages is controllable as a function of the weights of the carriages that are detected by the weight detection device, using a control device, wherein a distance sensor is used to ascertain the distance between successive carriages, wherein the distance between the two successive carriages is increased when a load on the carrier system is decreased.

2. The transport system as recited in claim 1, wherein the carrier device is in the form of a carrying arm.

3. The transport system as recited in claim 1, wherein weight detection device includes at least one sensor in an area of the carriage, in an area of the carrier device.

4. The transport system as recited in claim 3, wherein the at least one sensor includes a strain gauge.

5. The transport system as recited in claim 1, wherein weight detection device includes at least one sensor in an area of a support element or a carrier element.

6. The transport system as recited in claim 1, wherein weight detection device includes an image detection system that is configured to optically detect a payload, including persons, present in an area of the gondola, and to compute the weight of the carriage based on a predefined weight of the carriage without the payload.

7. The transport system as recited in claim 1, wherein the gondola is supported via at least one pneumatic tire of the drive unit at the carrier system and the weight detection device includes a pressure sensor that detects a payload-dependent pneumatic tire pressure prevailing in the pneumatic tire of the drive unit.

8. The transport system as recited in claim 1, further comprising a detection device in an area of the gondolas, configured to detect the distance between the two successive carriages, and the distance between the two successive carriages is provided to the control device as an input parameter.

9. The transport system as recited in claim 1, wherein the distance between the two successive carriages and the weight of the carriages are controllable by further influencing parameters including wind strength, temperature or an amount of precipitation.

10. A method for controlling a distance between two successive carriages at an elevated railway-like transport system which includes:
   a carrier system with rail-like or cable-like carrier elements that are fastened in an area of support elements, and the carrier system including self-propelled carriages, each of the carriages including a drive unit that cooperates with the carrier elements, and a gondola that is connected to the drive unit via a carrier device, and that is used for passenger transport or cargo transport, the carriages being movable independently of one another along the carrier elements, and a distance being formed between two successive carriages on the same carrier element, and wherein the carrier system further includes a weight detection device configured to indirectly detect a weight of the self-propelled carriages,
   wherein a minimum distance between two successive carriages is controllable as a function of the weights of the carriages that are detected by the weight detection device, using a control device, wherein a distance sensor is used to ascertain the distance between successive carriages, wherein the distance between the two successive carriages is increased when a load on the carrier system is decreased,
   wherein the method comprises the following steps:
   detecting weights of at least the two successive carriages along the carrier elements;
   determining a minimum distance between the two successive carriages based on predefined maximum loads on the carrier system; and
   indirectly ensuring the minimum distance by outputting information to an operator of at least one carriage or by direct activation of drives of at least one carriage by the control device.

11. The method as recited in claim 10, wherein the distance between the two successive carriages is reduced to the minimum distance, taking into account factors including wind strength, temperature, an amount of precipitation, or regulatory requirements, that increase the minimum distance.

12. A non-transitory data medium on which is stored a computer program for controlling a distance between two successive carriages at an elevated railway-like transport system including:
   a carrier system with rail-like or cable-like carrier elements that are fastened in an area of support elements, and the carrier system including self-propelled carriages, each of the carriages including a drive unit that cooperates with the carrier elements, and a gondola that is connected to the drive unit via a carrier device, and that is used for passenger transport or cargo transport, the carriages being movable independently of one another along the carrier elements, and a distance being formed between two successive carriages on the same carrier element, and wherein the carrier system further includes a weight detection device configured to indirectly detect a weight of the self-propelled carriages, wherein a minimum distance between two successive carriages is controllable as a function of the weights of the carriages that are detected by the weight detection device, using a control device, wherein a distance sensor is used to ascertain the distance between successive carriages, wherein the distance between the two successive carriages is increased when a load on the carrier system is decreased;

wherein the computer program, when executed by a computer, causes the computer to perform the following steps:

detecting weights of at least two successive carriages along the carrier elements;

determining a minimum distance between the two successive carriages based on predefined maximum loads on the carrier system; and indirectly ensuring the minimum distance by outputting information to an operator of at least one carriage or and/or by direct activation of drives of at least one carriage by the control device.

13. A control device configured to receive at least data from a weight detection device and to output information to an operator of at least one carriage, or to activate drives of at least one carriage in order to indirectly ensure a minimum distance between two successive carriages, wherein the carriages are part of an elevated railway-like transport system including:

a carrier system with rail-like or cable-like carrier elements that are fastened in an area of support elements, and the carrier system including self-propelled carriages, each of the carriages including a drive unit that cooperates with the carrier elements, and a gondola that is connected to the drive unit via a carrier device, and that is used for passenger transport or cargo transport, the carriages being movable independently of one another along the carrier elements, and a distance being formed between two successive carriages on the same carrier element, and wherein the carrier system further includes the weight detection device configured to indirectly detect a weight of the self-propelled carriages, wherein the control device is configured to control a minimum distance between the two successive carriages as a function of the weights of the carriages that are detected by the weight detection device, wherein a distance sensor is used to ascertain the distance between the successive carriages, wherein the distance between the two successive carriages is increased when a load on the carrier system is decreased.

* * * * *